J. SCHIES.
VEHICLE WHEEL.
APPLICATION FILED APR. 17, 1913.

1,142,985.

Patented June 15, 1915.

2 SHEETS—SHEET 1.

Witnesses:
Jacob A. Hollander
Theresa M. Silber

Inventor:
John Schies
By R. P. Herbsleb
His Attorney

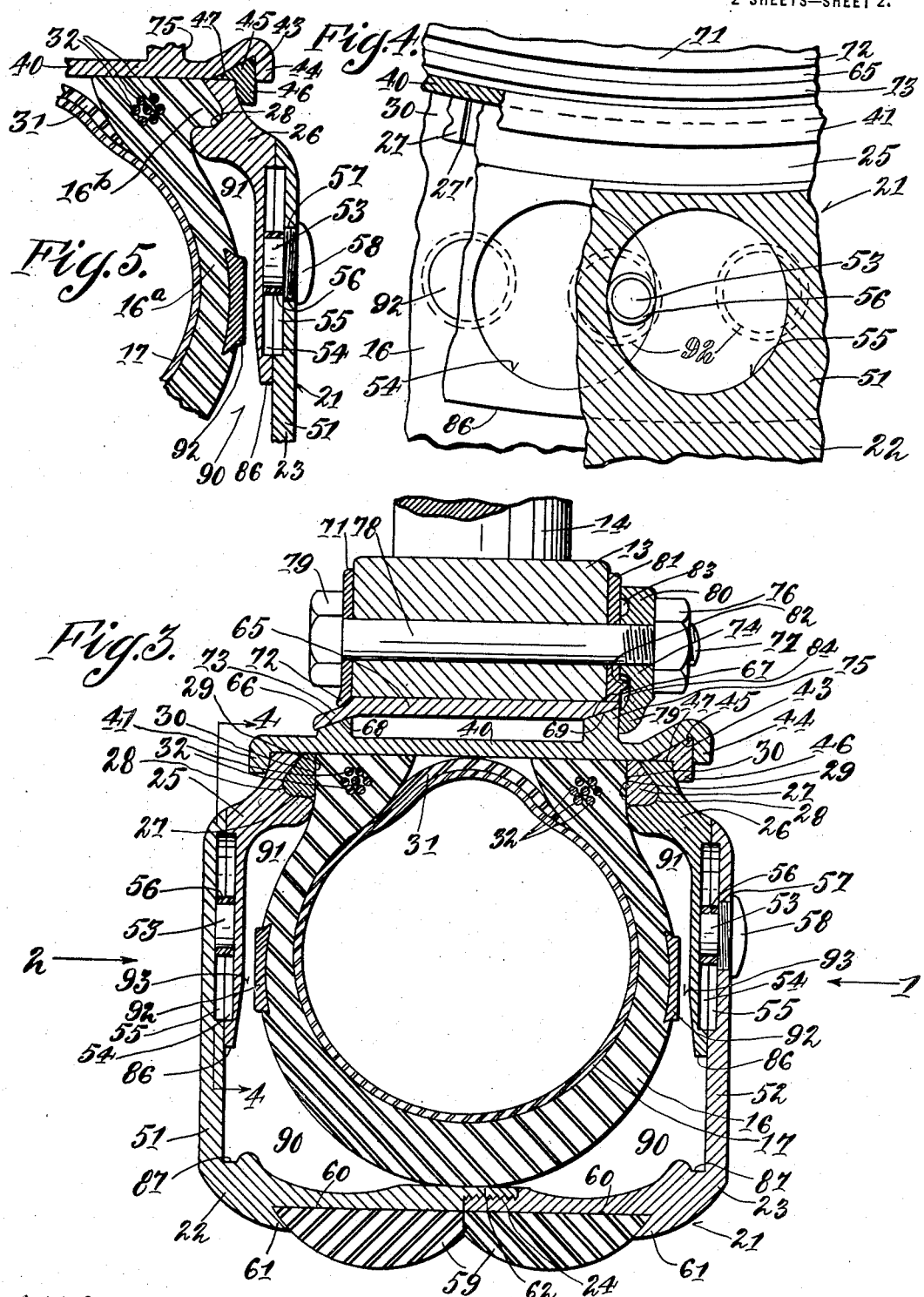

UNITED STATES PATENT OFFICE.

JOHN SCHIES, OF ANDERSON, INDIANA.

VEHICLE-WHEEL.

1,142,985.

Specification of Letters Patent. Patented June 15, 1915.

Application filed April 17, 1913. Serial No. 761,694.

*To all whom it may concern:*

Be it known that I, JOHN SCHIES, a citizen of the United States, residing at Anderson, in the county of Madison and State of Indiana, have invented certain new and useful Improvements in Vehicle-Wheels, of which the following is a specification.

My invention relates to vehicle wheels employing a pneumatic cushion tire.

Figure 1:
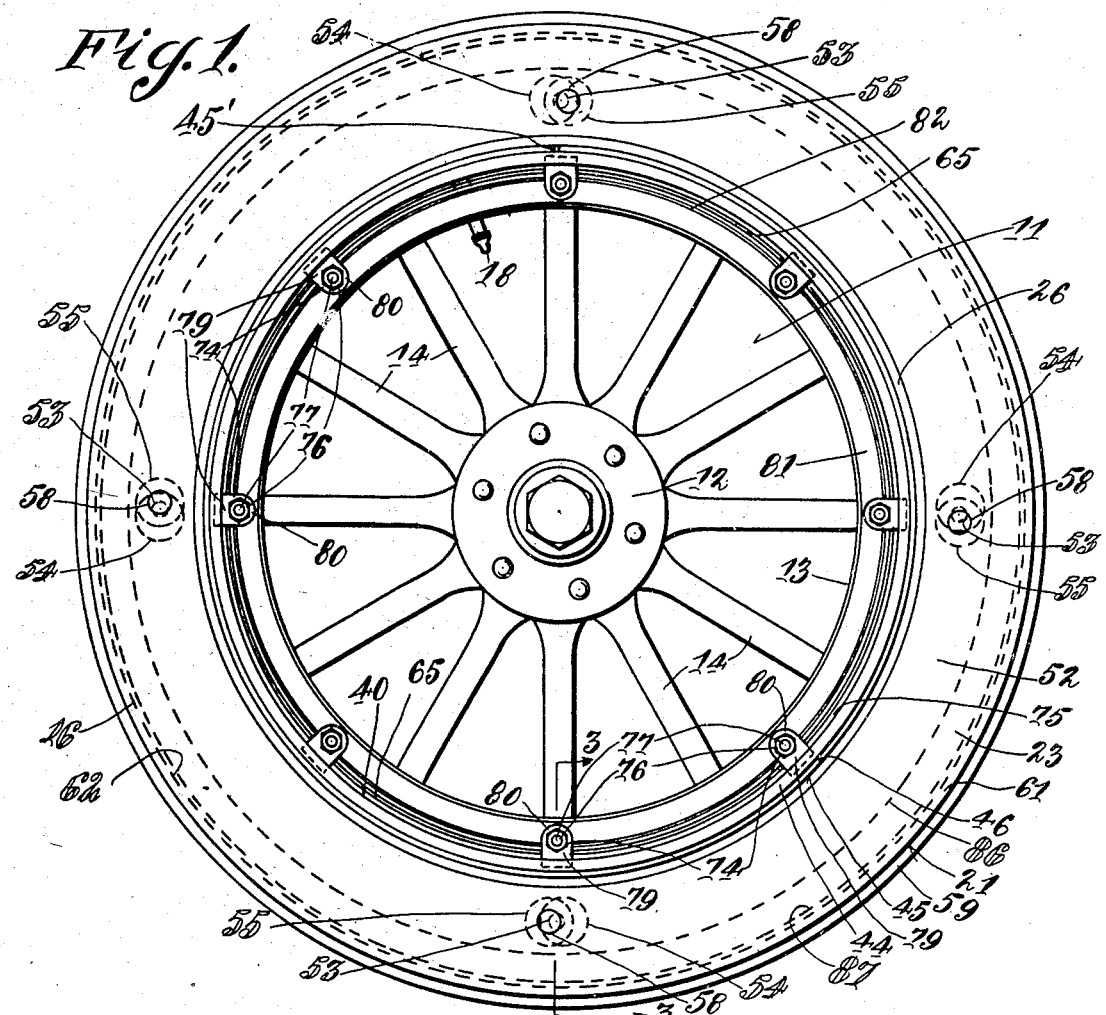
Figure 2:
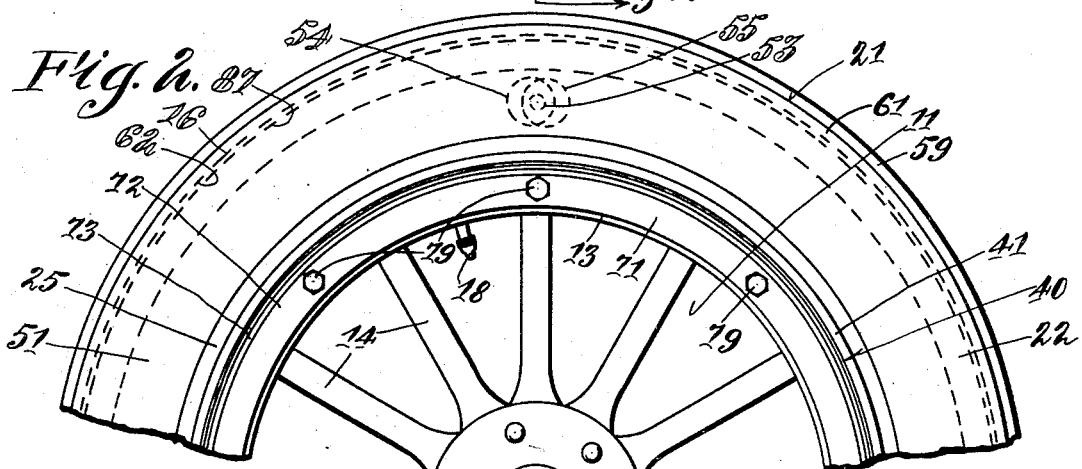

It is the object of my invention to provide a novel protecting member to protect the inflated tube of the tire from contact with penetrating objects, such as nails, and other articles liable to injure the tube; further, to remove the flexible tire from contact with the ground by novel means so as to protect said tire from the wear of the tractive movement or contact with the ground; further, to provide a novel protective casing for the flexible tire which is provided with means for holding said tire in place; further to provide novel protecting means capable of use in connection with the usual standard pneumatic tires; and, further, to provide novel means for mounting the protective casing, and the invention will be further readily understood from the following description and claims, and from the drawings, in which latter:

Figure 1 is a side elevation of my improved device, viewed in the direction of the arrow 1 in Fig. 3. Fig. 2 is a side elevation of the same, partly broken away, and viewed in the direction of the arrow 2 in Fig. 3. Fig. 3 is an enlarged cross-section of my improved device taken on the line 3—3 of Fig. 1. Fig. 4 is a detail of my improved device, partly broken away, and partly in section on the line 4—4 of Fig. 3; and, Fig. 5 is a cross-section, taken on a line corresponding to the line 3—3 of Fig. 1, partly broken away, showing my improved device applied in connection with a so-called clencher tire.

11 represents the body-member of a vehicle wheel, which, as it is usually constructed, embraces the hub 12, the rim 13, and the spokes 14. An inflatable or pneumatic tire encircles the body-member, and as shown comprises an outer flexible member 16 and an inner tube 17, the outer flexible member being shown as detachable. The inner tube is arranged to be inflated, as through a usual inflating valve 18 communicating with the inner tube. The flexible tire-member is encircled by a tread-member 21, exemplified as made of a plurality of metal parts so as to enable the parts to be separated for permitting the parts to be received about the flexible tire-member. I exemplify the tread-member as comprising the parts 22, 23, having a connection 24 between the same, this connection being shown as a threaded connection.

For securing the flexible tire-member and the tread-member in place, I provide side-flanges 25, 26. These side-flanges are exemplified as provided with abutments toward which the inner abutting faces of the outer flexible member 16 are arranged to be forced by the compressed air or fluid in the inner tube 17 of the pneumatic structure. These abutments may be flat or of the so-called clencher type. Referring to Figs. 3 and 4, these abutments for the bases of the flanges may be in the form of abutment-rings 27 received in annular clencher-grooves 28, the abutments-rings having flat inner faces 29 against which the flat outer faces 30 of the base of the flexible casing are received. The abutment-rings and clencher-grooves preferably extend annularly about the body-member. In Fig. 5 I have shown the flexible-member 16ª formed with a clencher-lip 16ᵇ, which is also preferably annular about the body-member, one of these clencher-lips being located in each of the clencher-grooves 28.

A usual annular apron 31 may be received between the inner tube and the bases of the outer flexible tire-member. These bases may also be provided with annular retaining wires 32 surrounding the body-member.

The side-flanges 25, 26, are preferably annular members, and are held against outward lateral displacement. In the present exemplification there is an annular band 40 received about the body-member, having a flange 41 at one edge thereof which limits the outward movement of the base of the side-flange 25. The annular band is further exemplified as provided with an annular groove 43 having an outer wall 44 in which a filling-ring 45 is received, this ring being a split-ring as shown at 45′ which is readily removable, and is provided with a flange 46 and a bottom wall 47, the peripheral face of the latter coinciding with the peripheral face of the annular band 40. The base of the side-flange 26 is arranged to be located by the wall 47 and the peripheral face of the annular band 40. The outward movement of the flange 26 is limited by the flange 46 on the split-ring 45, the latter being positioned by the walls of the annular groove 43. In assembling the parts, the split-ring 45 having been removed, the annular side-flange 25, the annular inflatable cushion, and the annular side-flange 26 are slipped over the annular band 40, in the order named, and the split-ring is replaced in the groove 43, the cushion being then inflated for separating the side-flanges. The side-flanges have slide-connection on said annular band 40, the side-flange 26 also having slide-connection on the annular bottom wall 47 of the split-ring 45. The structure forms a quick-detachable means for the flexible tire-structure.

The flanges 25, 26, extend radially of the wheel and act as side-guides for the inwardly extending flanges 51, 52, of the tread-member 21. The tread-member is thus positioned laterally. In order to limit rotary movement between the body-member and the tread-member and permit vertical movement between said members, I provide impact disks 53 in recesses 54, 55, respectively in the side-flanges 25, 26, and in the side-flanges 51, 52. These disks have free movement between the walls of the recesses which register with each other. These impact disks are shown as provided with cushions, shown in the form of rubber rings 56 around the edges of said disks. These disks float in said recesses, their position therein being dependent on the relative positions of the coacting flanges. The parts are assembled while the inflatable member is deflated, and to permit relative rotation between the parts of the tread-member in assembling, I provide openings 57 at one of the sets of mating recesses, to permit the locking disks to be slipped thereinto after assembling of the parts of the tread-member, the openings being closed by caps 58. I prefer to provide the tread-member with a solid cushion-tread, shown as a two-part tread 59, received annularly about the tread-member. Each part is preferably located in an annular rabbet 60 in one of the parts of the tread-member. These cushion tread-parts are preferably held in place against lateral displacement by annular shoulders 61 and by contact with each other. The tread-member is provided preferably with an inner annular bearing-surface 62 upon which the flexible tire-structure is arranged to bear.

If desired, the annular band 40 may be made demountable with relation to the body-member of the wheel. I exemplify means by which this may be accomplished, but it is obvious that other means for quickly demountably mounting the annular band on the body-member may be employed without departing from the spirit of my invention. Thus 65 is an annular supporting band received about the rim 13. It is provided with an annular wedge face 66 and an annular wedge face 67 coacting respectively with wedge faces 68, 69, on the annular band 40, the coacting wedge faces 66, 68, being preferably of larger diameters than wedge faces 67, 69, so that the annular wedge faces 68 may be received past the wedge face 67 in the mounting and demounting of the annular band 40.

71 is a shoulder-plate annularly arranged at the side of the rim 13 and provided with a shoulder 72 with which a shoulder 73 on the annular band 65 is arranged to coact.

Blocks 74 are arranged to coact with the shoulder 75 on the band 40 for clamping the band 40 upon the supporting band 65. These blocks are arranged at intervals annularly about said bands. The clamping force upon the blocks may be exerted by clamp-nuts 76 threaded about the threaded ends 77 of tie-bolts 78, the other ends of said tie-bolts being provided with heads 79 holding said plate 71. The clamping blocks 74 are preferably provided with clamping lips 79 which extend radially a greater distance from the axis of the tie-bolt than the heels 80 of the blocks, so that said blocks may be turned into positions out of the range of the longitudinal projection of the annular band 40, so that the annular band may be readily removed for demounting the combined tire-structure and protective casing. For locating the blocks in releasing positions, a band 81 is provided at the outer face of the rim 13. This band may be annular or consist of sections arranged annularly about the rim. The band is provided with a ridge 82 and the blocks with coacting slots 83, 84, this ridge and the respective slots being in coacting relation when the clamping lip is in clamping relation with the clamping shoulder 75 or when the block is swung half way around, so that its heel-end 80 is adjacent to the said shoulder 75.

The tread-member, in operation, forms a protection for the pneumatic tire-structure and prevents the same from contacting with the ground, and, in the form shown, the tread-member and its connecting parts form a protecting casing for the pneumatic tire-structure. The tread-member is arranged to have sliding movement upon the flanges 25, 26, in a vertical direction, dependent on the yielding movements permitted by the pneumatic tire-structure. The relative movements between the flanges of the tread-structure and the flanges extending outwardly from the body-member are preferably sufficient in extent to permit the desired extent of yield of the pneumatic tire-structure, but means are provided to prevent undue crushing of the tire-structure by permitting the outer edges 86 of the flanges 25, 26, to be received in the inner annular grooves 87 in the tread-member, which permits riding, even with substantially deflated condition of tire-structure.

My improved device is so constructed that the same may be applied to vehicle wheels now in use by the substitution of my improved inner flanges and the parts coacting therewith for the cheek-members of the ordinary quick-detachable tire-structures now in use, and permits the use of the ordinary tires now in use. I may substitute a tire of next smaller cross-section without appreciably increasing the cross-sectional dimensions of the cushion-portion of the wheel. Thus I am permitted to substitute a three and one-half inch diameter tire for one of four inches heretofore used on a wheel, and to add my protective casing without perceptible increase in diameter of the cushion-portion of the wheel, and my improved device also permits the employment of the usual pneumatic tires now in use, even if the same have been considerably worn in use.

I provide considerable space cross-sectionally in my improved device for the spreading of the pneumatic tire-member in operation. Thus, adjacent to the peripheral portion I provide spaces 90, into which the tread-portion of the tire-structure may be spread, this space being at the respective sides of the tread-ring 62 at the inner face of the peripheral portion of the tread-member. I also provide spaces 91 at the respective sides of the base of the outer casing. If desired, the sides of the flexible tire-structure may be provided with contact plates 92, arranged annularly about said flexible tire-structure, to receive any impact or rubbing there might be between the said tire-structure and the inner faces of the side-flanges 25, 26. The abutment-rings 27 are split rings as shown at 27′ to permit their ready insertion in the clencher-grooves 28. If desired, the flat inner faces 29, against which the flat outer faces 30 of the base of the flexible casing are received, may be formed on the flanges 25, 26. There is preferably a space 93 between said pneumatic tire-structure and each of said side-flanges, to permit substantial yield of the pneumatic tire-structure to weight, impacts or compressive actions, prior to such rubbing action.

Having thus fully described my invention, what I claim as new and desire to secure by Letters Patent, is:

1. In a vehicle wheel, the combination of a body-member, a pneumatic tire-member around the same, said body-member provided with annularly arranged shoulders, and a pluri-part protective casing received about said tire-member and comprising an inner member and an outer member, said inner member normally having lateral movement with relation to said shoulders parallel to the axis of rotation of said wheel and locked in place against said shoulders solely by the expansive action of said pneumatic tire-member, the outer and inner parts of said pluri-part protective casing having vertical guiding movement between them.

2. A protective casing for a vehicle wheel comprising a pair of side-flanges, means for limiting separating movement between said side-flanges, said side-flanges normally having guided movement between them parallel to the axis of rotation of said vehicle wheel relative to said limiting means, and an inflatable cushion causing separation between said side-flanges in directions substantially parallel to the axis of rotation of said vehicle wheel into coaction with said limiting means.

3. In a vehicle wheel, the combination of a supporting member, an inflatable tire-structure thereabout, side-flanges, said supporting member provided with an abutment for one of said side-flanges for limiting outward lateral movement thereof, said last-named side-flange normally having lateral movement toward and from said abutment, said side-flanges arranged for being separated for exerting pressure toward said abutment by inflation of said tire-structure, and a tread-member guided by said side-flanges in the separated relation of said side-flanges.

4. In a vehicle wheel, the combination of a supporting member, an inflatable tire-structure, side-flanges, said supporting member provided with abutting means for limiting separation of said side-flanges, said side-flanges normally having movement between them on said supporting member, said side-flanges arranged for being separated for exerting pressure toward said abutting means by inflation of said tire-structure, a tread-member guided by said side-flanges, and limiting means between said tread-member and a side-flange for limiting relative rotation between the same.

5. In a vehicle wheel, the combination of a supporting member, an inflatable tire-structure, side-flanges, said supporting member provided with abutting means for limiting separation of said side-flanges, said side-flanges normally having movement between them on said supporting member, said side-flanges arranged for being separated for exerting pressure toward said abutting means by inflation of said tire-structure, a tread-member guided by said side-flanges, an annularly arranged limiting means between said tread-member and said side-flanges for limiting approach of said tread-member toward said supporting member and thereby forming an annular cavity in which said inflatable tire-structure is located and protected from total collapse.

6. In combination, in a vehicle wheel, a body-member, an inflatable flexible tire around the same, said inflatable flexible tire having a base-portion arranged to spread upon inflation of said tire, a tread-member around the said inflatable flexible tire, said tread-member having an inwardly extending flange, said body-member provided with a lateral abutment, a side-flange between said inflatable flexible tire and said inwardly extending flange, said side-flange normally having lateral movement on said body-member parallel to the axis of rotation of the wheel toward and from said lateral abutment, said side-flange having a base rigid therewith received between said lateral abutment and said base-portion of said inflatable tire and arranged to be pressed toward said lateral abutment by the spread of said base-portion upon inflation of said inflatable flexible tire for positioning said side-flange in sliding relation with said inwardly extending flange.

7. In a vehicle wheel, the combination of a body-member, a pair of side-flanges extending outwardly therefrom, an inflatable flexible tire around said body-member between said side-flanges, a tread-member around said inflatable flexible tire, said tread-member provided with inwardly extending flanges coacting with said side-flanges, said inflatable flexible tire having a base-portion arranged to spread upon inflation of said tire, one of said side-flanges normally loosely arranged about said body-member for lateral movement thereon, said body-member provided with an annularly arranged shoulder for limiting the outward movement of said last-named side-flange, said last-named side-flange pressed outwardly into coacting relation with said shoulder by the spreading of said base-portion upon inflation of said inflatable tire and thereby positioning said side-flanges into guiding relation with said inwardly extending flanges.

8. In a vehicle wheel, the combination of a body-member, a pair of side-flanges having a slip-connection therewith in a direction parallel to the axis of rotation of said wheel and positioned vertically by said body-member, an inflatable flexible tire received about said body-member between said side-flanges, a tread-member received about said inflatable flexible tire and provided with a pair of inwardly extending flanges, said body-member provided with annularly arranged shoulders, said inflatable flexible tire having a base-portion coacting with said side-flanges arranged to spread upon inflation of said tire, said side-flanges forced apart into slide-connection with said inwardly extending flanges solely by the spreading of said base-portion upon inflation of said inflatable flexible tire, and said annularly arranged shoulders limiting said spreading movement of said side-flanges.

9. In a vehicle wheel, the combination of a body-member provided with an annularly arranged shoulder, a pair of annularly arranged side-flanges, a removable ring provided with contact-faces, said removable ring positioned outwardly by said annularly arranged shoulder, one of said side-flanges having contact-faces thereon coacting with said contact-faces on said removable ring, a tread-member having inwardly extending flanges, and an inflatable flexible cushion having a base-portion arranged to spread and coact with said side-flanges for causing coaction between said contact-faces on said side-flange and said contact-faces on said removable ring and causing separation between said side-flanges for positioning the same in sliding relation with said inwardly extending flanges.

10. A protective casing for a vehicle wheel comprising a supporting part, a pair of outwardly extending side-flanges extending therefrom, a tread-member having a pair of inwardly extending side-flanges having slide-connection with said first-named side-flanges, an inflatable cushion between said supporting part and said tread-member located between said flanges, said tread-member comprising a pair of parts on each of which one of said flanges thereof is located, said pair of parts separable by relative rotative and axial movement between said parts, the respective flanges of said pairs of flanges coacting with each other, said coacting flanges provided with recesses, locking disks of less diameters than said recesses received in said recesses, and releasable closing caps for said recesses.

In testimony whereof, I have hereunto signed my name in the presence of two subscribing witnesses.

JOHN SCHIES.

Witnesses:
 CHARLEY SCHIES,
 JAS. E. HENNINGS.